United States Patent
Yang et al.

(10) Patent No.: US 6,452,757 B1
(45) Date of Patent: Sep. 17, 2002

(54) DATA SENSOR INCLUDING LAYERED DIELECTRIC GAP

(75) Inventors: Liu Yang, Eden Prairie, MN (US); Helen Chung, Urbana, IL (US); Jumna Ramdular, Brooklyn Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/523,296

(22) Filed: Mar. 10, 2000

Related U.S. Application Data

(60) Provisional application No. 60/157,875, filed on Oct. 5, 1999.

(51) Int. Cl.$^7$ ................................................ G11B 5/39
(52) U.S. Cl. ..................................................... 360/317
(58) Field of Search ............................... 360/317–318.1

(56) References Cited

U.S. PATENT DOCUMENTS

| | | | |
|---|---|---|---|
| 4,469,747 A | 9/1984 | Sasaki et al. | 428/325 |
| 4,692,344 A | 9/1987 | Kaganowicz et al. | 427/39 |
| 5,225,286 A | 7/1993 | Fujikawa et al. | 428/426 |
| 5,707,538 A * | 1/1998 | Shen | 360/113 |
| 5,763,108 A * | 6/1998 | Chang | 360/317 |
| 6,103,073 A * | 8/2000 | Thayamballi | 204/192.2 |

* cited by examiner

Primary Examiner—A. J. Heinz

(57) ABSTRACT

A data transfer head includes a data transfer element for transferring date between the data transfer head and a data storage medium and a dielectric gap electrically shielding the data transfer element. The dielectric gap includes a plurality of layered dielectric film wherein adjacent dielectric films are formed of different dielectric materials. A method of forming a magnetoresistive sensor includes forming a thin film data transfer element and forming a dielectric gap to electrically shield the data transfer element. Forming the dielectric gap includes depositing a number of adjacent dielectric films on an underlayer and depositing a second dielectric film on the first dielectric film. The second dielectric film being different from the first dielectric film.

18 Claims, 3 Drawing Sheets

410

| Al2O4 (75 A) 412 |
| SiN (75 A) 411 |

| SiN (50 A) 423 |
| Al2O4 (50 A) 422 |
| SiN (50 A) 421 |

| Al2O4 (40 A) 435 |
| SiN (40 A) 434 |
| Al2O4 (40 A) 433 |
| SiN (40 A) 432 |
| Al2O4 (40 A) 431 |

Fig. 4C

DATA SENSOR INCLUDING LAYERED DIELECTRIC GAP

CROSS-REFERENCE TO RELATED APPLICATION(S)

This application claims the benefit of the filing date of U.S. Provisional Application Ser. No. 60/157,875 entitled "High Breakdown Strength Dielectric Materials With Tunable Interface" which was filed on Oct. 5, 1999. This application is related to a U.S. Patent application Ser. No. 09/522,517 entitled "Dielectric Gap Material For Magnetoresistive Heads With conformal Step Coverage," which was filed in the name of applicants Liu Yang, Jumna Ramdular, Sara Gordon, Ralph Knox and John Dzarnoski on Mar. 10, 2000.

BACKGROUND

Thin film magnetic recording heads are used in the data storage industry for recording data onto narrow tracks on a magnetic medium, such as a hard disk drive platter. FIG. 1 shows a simplified cross sectional view of an exemplary recording head. The recording head 100 includes two conductive layers 101 and 103, called poles, separated by an insulating layer 105. The poles are conductively connected at one end 107 and are separated by a thin non-magnetic gap layer 102 at another end 108 so that the overall configuration of the connected conductive layers 102 and 103 has a somewhat horseshoe-like shape. Conductive wires 104 are embedded within the insulating layer 105 to form a conductive coil. During a write operation a magnetic flux 106 is induced in the poles by an electrical current flowing through the coils 104. This magnetic flux 106 protrudes at a discontinuity caused by the thin non-magnetic insulating layer 102. The protruding flux may be used to write data on a disk surface.

After data is written to a magnetic medium using a recording head, the data may be read from the medium using a read sensor. Some types of recording heads can operate as read sensors. However, a separate read-only sensor, such as a spin-valve sensor, can often provide improved read sensitivity. A spin valve sensors detects magnetically recorded data based on a change in resistance attributed to a magnetic spin-dependent transmission of conduction electrons between a free magnetic layer and one or more pinned magnetic layers through non-magnetic layers. FIG. 2 shows a simplified cross sectional view of a dual spin valve sensor. The sensor 200 includes a free magnetic layer 211 sandwiched between nonmagnetic layers 212 and 215 which, in turn, are sandwiched between pinned magnetic layers 213 and 216. The pinned magnetic layers 213 and 216 have a fixed magnetic direction set by pinning layers 214 and 217. Pinning layers 214 and 217 may be formed from a hard magnetic material (i.e., a material having a fixed magnetic direction) or may be exchange tabs in contact with surfaces of the layers 213 and 216. Single spin valve sensors may include layers 211–214 and omit layers 215–217.

Recording heads and read sensors can be isolated from each other using magnetic and dielectric layers. The magnetic and dielectric layers provide electrical and magnetic interference protection and can also provide corrosion resistance and other desired properties. As head geometries decrease, greater challenges are faced in forming thin and reliable magnetic and dielectric layers. Among the challenges faced are forming a dielectric gap with a high breakdown and low leakage current to provide effective isolation between the write head and read sensor stack. Consequently, improved dielectric gaps for use in thin film heads, and means to form such gaps, are desired.

SUMMARY

In general, in one aspect, the invention features a data transfer head. The head includes a data transfer element for transferring date between the data transfer head and a data storage medium and a dielectric gap electrically shielding the data transfer element. The dielectric gap includes a plurality of layered dielectric film wherein adjacent dielectric films are formed of different dielectric materials.

Implementations may include one or more of the following features. The first and second dielectric materials may each have a thickness of less than one micron between their first and second opposing surfaces. A surface of one of the dielectric films may be adjacent to a surface of the data transfer element. Different dielectric layers formed of the same dielectric material may be separated along at least a subsection by a different dielectric material. The different dielectric materials may be selected from the group consisting of $A_2O_3$, $Si_3N_4$, SiC, $SiO_2$, AlN, $Ta_2O_5$, $TiO_2$, BN, and diamond-like carbon. The data transfer element may be, e.g., a spin valve or other read sensor or a write head and the data transfer head can include both a read sensor and a write head separated by the dielectric gap.

In general, in another aspect, the invention features a method of forming a magnetoresistive sensor. The method includes forming a thin film data transfer element and forming a dielectric gap to electrically shield the data transfer element. Forming the dielectric gap includes depositing a number of adjacent dielectric films on an underlayer and depositing a second dielectric film on the first dielectric film. The second dielectric film being different from the first dielectric film.

Implementations may include one or more of the following features. Additional dielectric films may be deposited to form the dielectric gap. For example, a third dielectric film can be deposited over the second dielectric film. The first and third dielectric films may be of the same material and may be separated from each other by the second dielectric film which is of a different dielectric material. Forming the thin film data transfer element may include forming a magnetic read sensor and/or a write head and forming the dielectric gap may include forming the dielectric gap between a read sensor and a write head.

Implementations may include one or more of the following advantages. A multi-layer dielectric can be used to provide a dielectric gap having opposing surfaces with different bonding and adhesion characteristics. The opposing surfaces may be formed of different materials selected to provide good adhesion to adjacent surfaces of other layers. A dielectric may exhibit improved corrosion resistance, increased breakdown voltage, and/or decreased leakage current.

DESCRIPTION OF DRAWINGS

FIGS. 4A–4C show cross sectional views of dielectric layers.

DETAILED DESCRIPTION

Figure 1:
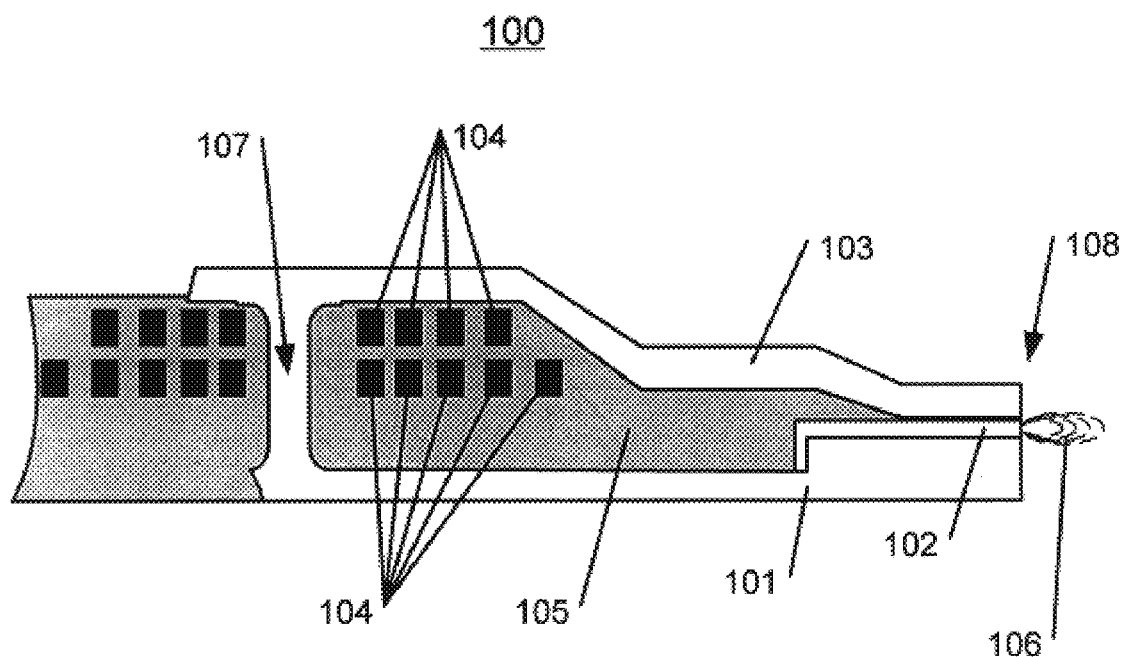
FIG. 1 is a recording head.
Figure 2:
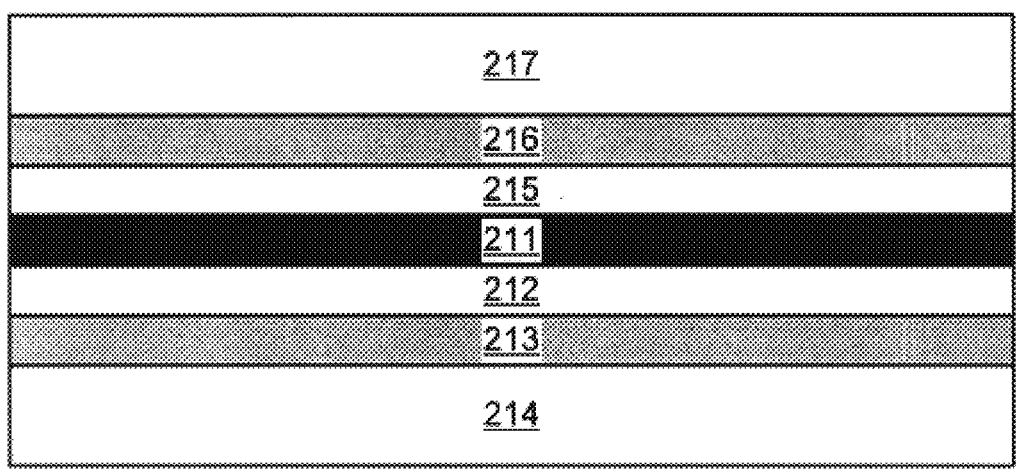
FIG. 2 is a dual spin valve read sensor.
Figure 3:
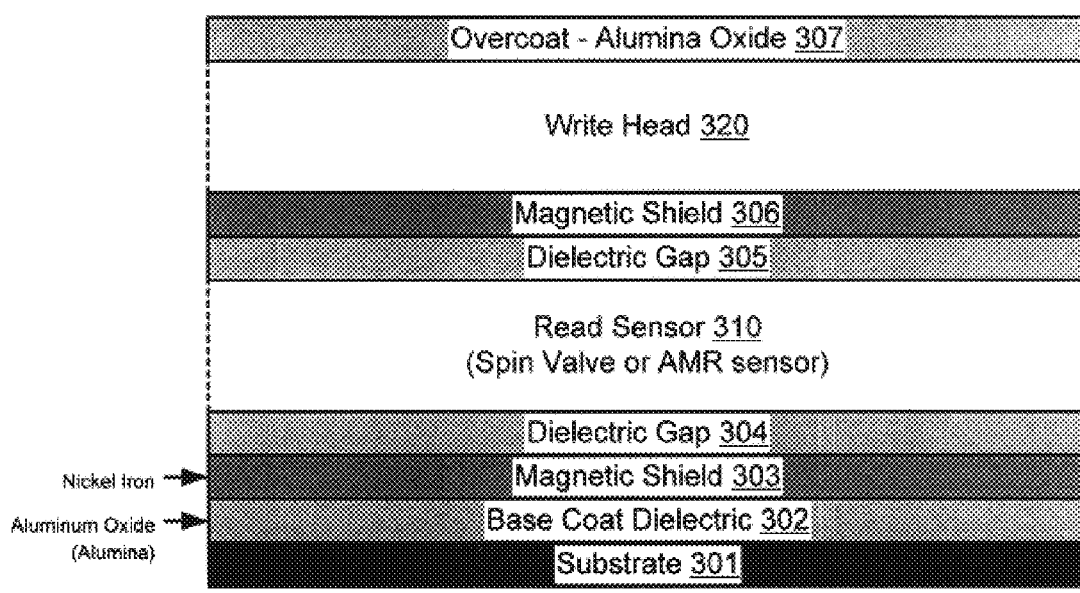
FIG. 3 shows a simplified cross sectional view of a thin film magnetic head.

FIG. 3 shows a thin film data head 300 that includes two data transfer elements, that is, a read sensor 310 and a separate write head 320 (read sensor 310 and write head 310 are shown in a simplified block view). The read sensor 310 can be a dual spin valve 200, a single spin valve, an anisotropic magnetoresistive read sensor, or other thin film read sensor. Similarly, the write head may include a layered pole and coil structure in accordance with write head 100, or another write head structure. The read sensor 310 can be magnetically isolated from the write head 320 and other sources of magnetic interference by magnetic shields 303 and 306. The magnetic shields 303 and 306 may be formed from thin layers of ferromagnetic material, such as a nickel-iron. The head 300 also includes dielectric gap layers 304 and 305. The gap layers 304 and 305 electrically isolate and protect the read sensor 310 and write head 320.

Dielectric gap layers 304 and 305 can be formed by depositing dielectric material on an underlying layer (i.e., on top of layer 303 or on top of a layer of the sensor 310). Ideally, the material used for a gap layer 304 and 305 should exhibit a high breakdown voltage, a low current leakage, and good adhesion to the underlying layer as well as good adhesion with layers applied on top of the gap layer. These criteria can be difficult to meet when using a single dielectric material to form a dielectric gap 304 or 305. For example, a dielectric material adheres well to the magnetic shield 303 may adhere poorly to a layers of the read sensor 310 deposited on the gap 304.

Improved dielectric gap may be realized by forming dielectric gaps from multiple layers of different dielectric materials ("layered dielectric gaps"). FIGS. 4A–4C shows layered dielectric is gaps 410, 420, and 430. The layered dielectric gaps 410, 420, and 430 are each formed from two or more layers of different dielectric materials. For example, gap 410 is formed from a bottom layer of silica nitrate 411 and a top layer of alumina 412; gap 420 is formed from a bottom layer of silica nitrate 421, a middle layer of alumina 422, and a top layer of silica nitrate 423; gap 430 is formed from a bottom layer of alumina 431, a first intermediate layer of silica nitrate 432, a second intermediate layer of alumina 433, a third intermediate layer of silica nitrate 434, and a top layer of alumina 435.

Layered dielectric gaps 410, 420, and 430 can be formed by deposited different dielectric materials on top of each other using known deposition techniques known in the semiconductor and thin film manufacture industry. For example, physical vapor deposition (PVD) (also known as sputtering) can be used to deposit alumina layers (412, 422, 431, 433, 435) and chemical vapor deposition (CVD) can be used to deposit silica nitrate layers (411, 421, 423, 432, 434). Other deposition processes also can be used. Such deposition techniques may be used to form extremely thing gaps layers. For example, layered dielectric gap 420 may be 200 angstroms (Å) thick and formed from sub-layers 421 and 432 that are each 25 Å thick and a layer 422 that is 150 Å thick. Thicker and/or thinner layers can also be used.

Layered dielectric gaps can be incorporated in a magnetic head 300 wherever a dielectric layer is needed. For example, a layered dielectric gap 430 can be used as dielectric gap structures 304 and 305. Construction of a thin film head 300 using layered dielectric gaps will now be described. Formation of the head 300 may begin with a sputter deposition of a base layer of alumina on a substrate 301 followed by a deposition of a magnetic shield layer 303 on the base layer 302. Next, a layered dielectric gap 304 is formed. Forming the layered dielectric gap 304 begins with a deposition of first dielectric gap materials onto a surface of the magnetic shield 303. The material used for the first dielectric gap layer may be selected based on adhesion properties of the magnetic shield 303 and the chosen material. Additional dielectric layers are then applied on top of the first dielectric material. In general, the dielectric material used for each of the additional dielectric layers will different from the dielectric material used for the immediately preceding layer. By way of example, suitable dielectric materials for gap 304 layers include alumina ($Al_2O_4$), silica nitrite ($Si_3N_4$), silicon carbide (SiC), silicon dioxide ($SiO_2$), aluminum nitrite (AlN), titanium oxide $Ta_2O_5$, borum nitrite (BN), or diamond-like carbon (DLC). Other dielectric materials may also be used.

As the sub-layers of gap 304 are deposited, the gap 304 can be "tuned" for maximum compatibility with layers that will be adjacent to the gap 304. For example, a dielectric gap 304 may be "tuned" to layers 303 and 310 by depositing a first dielectric material that adheres well to the magnetic layer 303, followed by a second dielectric material that adheres well to a first material, and finally depositing a third dielectric material that adheres well to the second material and to an adjacent layer of the read sensor 310. Particular materials, and the number and thickness of each layer may also be selected based on breakdown voltage, leakage current, corrosion, and other characteristics.

After the first gap layer 304 is formed, the read sensor 310 is deposited on top of the gap layer 304. A second layered dielectric gap 305 and magnetic shield 306 are then deposited on top of the read sensor 310 in a like manner as for layers 304 and 303, respectively. A write head 320 (e.g., head 100) can then be formed on top of the magnetic shield 306, followed by an overcoat layer 307. The overcoat layer may be a corrosion resistant layer, such as alumina. Read sensor 310 and write head 320 may be deposited according to known read sensor and write head manufacturing techniques.

A number of embodiments of the present invention have been described. Nevertheless, it will be understood that various modifications may be made without departing from the spirit and scope of the invention. For example, although the layered dielectric has been described for use as gap layers isolating a read sensor 310, layered dielectrics may be used to replace other dielectric layers in a thin film head 300. In addition, although non-adjacent dielectric layers in the dielectric gap are shown as being fully separated by intermediate layers, in some implementations the non-adjacent layers may be in contact along a region, for example, at an edge. Accordingly, other embodiments are within the scope of the following claims.

What is claimed is:

1. A data transfer head comprising:
  a data transfer element for transferring datum between the data transfer head and a data storage medium; and
  a dielectric gap electrically shielding the data transfer element, the dielectric gap comprising at least a first, second and third dielectric film, wherein said first dielectric film and said third dielectric film comprise a same dielectric material and said second dielectric film comprises a different dielectric material than the first and third dielectric film.

2. The data transfer head of claim 1 wherein the first, second, and third dielectric films each comprise opposing first and second surfaces, the second surface of the first dielectric film being adjacent to the first surface of the second dielectric film, and the second surface of the second dielectric film being adjacent the first surface of the third dielectric film.

3. The data transfer head of claim 2 wherein the first, second, and third dielectric materials each have a thickness of less than one micron between their first and second opposing surfaces.

4. The data transfer head of claim 2 wherein the first surface of the first dielectric film is adjacent to the data transfer element.

5. The data transfer head of claim 2 wherein the second surface of the third dielectric film is adjacent to the data transfer element.

6. The data transfer head of claim 1 wherein the data transfer element is a read sensor.

7. The sensor of claim 6 wherein the read sensor comprises a spin valve sensor.

8. The data transfer head of claim 6 further comprising a second data transfer element comprising a write head.

9. The data transfer head of claim 8 wherein the dielectric gap is between the first data transfer element and the second data transfer element.

10. The data transfer head of claim 1 wherein the first and third dielectric material selected form the group consisting of $Al_2O_3$, $Si_3N_4$, SiC, $SiO_2$, AlN, $Ta_2O_5$, $TiO_2$, BN, and diamond-like carbon.

11. The data transfer head of claim 10 wherein the second dielectric film comprises another dielectric material selected from the group consisting of $Al_2O_3$, $Si_3N_4$, SiC, $SiO_2$, AlN, $Ta_2O_5$, $TiO_2$, BN, and diamond-like carbon, and wherein the dielectric material selected for the first and third dielectric film is different from the dielectric material selected for the second dielectric film.

12. A data transfer head comprising:
   a data transfer element for transferring datum between the data transfer head and a data storage medium; and
   a dielectric gap electrically shielding the data transfer element, the dielectric gap comprising at least a first, second, third, fourth, and fifth dielectric film, wherein said first, third and fifth dielectric film comprise a same dielectric material and said second and fourth dielectric film comprise a different dielectric material than the first, third, and fifth dielectric film.

13. The data transfer head of claim 12 wherein the first, second, third, fourth and fifth dielectric films each comprise opposing first and second surfaces, the second surface of the first dielectric film being adjacent to the first surface of the second dielectric film, the second surface of the second dielectric film being adjacent the first surface of the third dielectric film, the second surface of the third dielectric film being adjacent the first surface of the fourth dielectric film, the second surface of the fourth dielectric film being adjacent the first surface of the fifth dielectric film.

14. The data transfer head of claim 13 wherein the first, second, third, fourth and fifth dielectric materials each have a thickness of less than one micron between their first and second opposing surfaces.

15. The data transfer head of claim 13 wherein the first surface of the first dielectric film is adjacent to the data transfer element.

16. The data transfer head of claim 13 wherein the second surface of the fifth dielectric film is adjacent to the data transfer element.

17. The data transfer head of claim 12 wherein the first, third and fifth dielectric material selected form the group consisting of $Al_2O_3$, $Si_3N_4$, SiC, $SiO_2$, AlN, $Ta_2O_5$, $TiO_2$, BN, and diamond-like carbon.

18. The data transfer head of claim 17 wherein the second and fourth dielectric film comprises another dielectric material selected from the group consisting of $Al_2O_3$, $Si_3N_4$, SiC, $SiO_2$, AlN, $Ta_2O_5$, $TiO_2$, BN, and diamond-like carbon, and wherein the dielectric material selected for the first, third and fifth dielectric film is different from the dielectric material selected for the second and fourth dielectric film.

* * * * *